(12) United States Patent
Take et al.

(10) Patent No.: US 9,284,728 B2
(45) Date of Patent: Mar. 15, 2016

(54) HONEYCOMB PANEL STACKED BODY MANUFACTURING METHOD AND HONEYCOMB PANEL STACKED BODY

(71) Applicant: SHIZUKA CO., LTD., Yamato (JP)

(72) Inventors: Koichi Take, Yokohama (JP); Kunio Takahashi, Hadano (JP); Shunji Takahashi, Machida (JP); Yoshihiko Ueki, Machida (JP)

(73) Assignee: SHIZUKA CO., LTD., Yamato-shi (JP)

( * ) Notice: Subject to any disclaimer, the term of this patent is extended or adjusted under 35 U.S.C. 154(b) by 0 days.

(21) Appl. No.: 14/233,268

(22) PCT Filed: Oct. 9, 2012

(86) PCT No.: PCT/JP2012/006460
§ 371 (c)(1),
(2) Date: Jan. 16, 2014

(87) PCT Pub. No.: WO2013/069202
PCT Pub. Date: May 16, 2013

(65) Prior Publication Data
US 2015/0284947 A1 Oct. 8, 2015

(30) Foreign Application Priority Data

Nov. 7, 2011 (JP) ................................ 2011-242970

(51) Int. Cl.
*F02K 1/82* (2006.01)
*E04B 1/86* (2006.01)
(Continued)

(52) U.S. Cl.
CPC ... *E04B 1/86* (2013.01); *B32B 3/12* (2013.01); *B32B 5/18* (2013.01); *B32B 37/1284* (2013.01);
(Continued)

(58) Field of Classification Search
USPC .......................................... 181/292, 288, 296
See application file for complete search history.

(56) References Cited

U.S. PATENT DOCUMENTS

| | | | |
|---|---|---|---|
| 4,989,688 A | * | 2/1991 | Nelson .................. E04B 1/8227 181/286 |
| 7,866,103 B2 | * | 1/2011 | Marschke ................. E04B 1/14 181/287 |

(Continued)

FOREIGN PATENT DOCUMENTS

| | | |
|---|---|---|
| EP | 1829674 A1 | 9/2007 |
| JP | 01-320145 A | 12/1989 |

(Continued)

OTHER PUBLICATIONS

International Search Report mailed Nov. 6, 2012 in counterpart application No. PCT/JP2012/006460.

*Primary Examiner* — Edgardo San Martin
(74) *Attorney, Agent, or Firm* — Kratz, Quintos & Hanson, LLP (57) ABSTRACT

A honeycomb panel laminate includes a sound absorbing face made of a foam, a sound absorbing layer, and a sound insulating face made of a foam. The sound absorbing layer is composed of a honeycomb material and a layer obtained by filling spaces with a hard foam material. The honeycomb material is bonded to the sound absorbing face by applying an adhesive to edges of the honeycomb material of the sound absorbing layer and pressing the edges against the sound absorbing face so that the edges bite into the foam. The sound insulating face is obtained by applying an adhesive allover a surface of the sound insulating face that makes contact with the honeycomb material and pressing opposite edges of cell walls of the honeycomb material against the sound insulating face so that the opposite edges bite into the surface, having the adhesive, of the foam.

4 Claims, 5 Drawing Sheets

(51) Int. Cl.
*B32B 3/12* (2006.01)
*B32B 5/18* (2006.01)
*B32B 37/12* (2006.01)
*B32B 37/14* (2006.01)
*F02K 1/78* (2006.01)
*G10K 11/168* (2006.01)
*G10K 11/172* (2006.01)
*E04B 1/74* (2006.01)
*G10K 11/165* (2006.01)

(52) U.S. Cl.
CPC ......... *B32B 37/146* (2013.01); *B32B 2266/025* (2013.01); *B32B 2266/0285* (2013.01); *B32B 2266/06* (2013.01); *B32B 2266/08* (2013.01); *B32B 2307/102* (2013.01); *B32B 2307/304* (2013.01); *B32B 2419/00* (2013.01); *B32B 2605/00* (2013.01); *E04B 2001/748* (2013.01); *G10K 11/165* (2013.01); *G10K 11/168* (2013.01); *G10K 11/172* (2013.01)

(56) References Cited

U.S. PATENT DOCUMENTS

| | | | | |
|---|---|---|---|---|
| 7,954,596 B2* | 6/2011 | Schulze | ............... | G10K 11/168 181/204 |
| 8,367,183 B2* | 2/2013 | Take | ............... | B32B 3/12 156/89.11 |
| 8,579,079 B2* | 11/2013 | Beauvilain | ............... | B60R 13/08 181/290 |
| 2007/0101679 A1* | 5/2007 | Harthcock | ............... | B60R 13/08 52/782.1 |
| 2008/0260992 A1* | 10/2008 | Take | ............... | B32B 3/12 428/117 |
| 2010/0307867 A1* | 12/2010 | Ogawa | ............... | B32B 3/18 181/288 |
| 2011/0079338 A1* | 4/2011 | Take | ............... | B32B 3/12 156/60 |
| 2013/0171407 A1* | 7/2013 | Franzoi | ............... | F02C 7/045 428/116 |

FOREIGN PATENT DOCUMENTS

| | | | | |
|---|---|---|---|---|
| JP | 2002283478 A | * | 10/2002 | |
| JP | 2005-43826 A | | 2/2005 | |
| JP | WO 2006132184 A1 | * | 12/2006 | ............... B32B 3/12 |
| JP | 2007-62181 A | | 3/2007 | |
| JP | 2007062181 A | * | 3/2007 | |
| JP | EP 1829674 A1 | * | 9/2007 | ............... B32B 3/12 |
| JP | 2011227470 A | * | 11/2011 | |

* cited by examiner

HONEYCOMB PANEL STACKED BODY MANUFACTURING METHOD AND HONEYCOMB PANEL STACKED BODY

TECHNICAL FIELD

The present invention relates to a method for manufacturing a honeycomb panel stacked body or laminate intended for use in the fields of sound proofing and heat insulation and to such a honeycomb panel stacked body or laminate.

BACKGROUND ART

Honeycomb panel laminates each having a honeycomb material as a core material and two face materials between which the honeycomb material is sandwiched are used in the fields of aircrafts, railroad vehicles, and building materials. In these fields, the honeycomb panel laminates have generally been used as weight-saving and strengthening members, and have mostly been used in a hollow state with no filling in a honeycomb cell space.

On the other hand, sound absorbing and heat insulating laminates each having a honeycomb material and two faces, each made of a metal or fiber-reinforced plastic having sound absorbing and heat insulating capabilities (FRP, CFRP, KFRP), between which the honeycomb material is interposed have comes to be widely used in ships, aircrafts, etc. (Patent Literature 1) and, furthermore, improved laminates have come each of which has a better sound insulation characteristic by having a sound absorbing layer obtained by filling honeycomb cell spaces with a member having a sound absorption characteristic (Patent Literature 2).

Patent Literature 1

Japanese Unexamined Utility Model Application Publication, No. S62-19304

Patent Literature 2

Japanese Patent No. 3806744

The title of the device of Patent Literature 1 is "SOUND ABSORBING AND HEAT INSULATING PANEL". This is a panel that has a honeycomb material and two faces, each having a porous sound absorbing and heat insulating material such as glass wool or rock wool sticking thereto, between which the honeycomb material is interposed, with honeycomb material cells being hollow.

The title of the invention of Patent Literature 2 is "METHOD FOR MANUFACTURING BREATHABLE SANDWICH PANEL AND SANDWICH PANEL". With a sound absorbing layer constituted by filling honeycomb cell spaces with phenol foam, this panel has two faces between which a honeycomb material is sandwiched, and one of the two faces is a sound absorbing face obtained by using a breathable aluminum fiber material having a sound absorbing structure, with a sound insulating face obtained by bonding a sound insulating plate having no flexibility to the other one of the two faces.

SUMMARY OF INVENTION

Technical Problem

In a laminated material based on a honeycomb material, the technologies disclosed in Patent Literatures 1 and 2 have had a problem with the bonding between a honeycomb material serving as a base and two face materials between which the honeycomb material is sandwiched.

That is, in order to enhance effectiveness as a soundproofing material or a sound insulating material, face materials that are to be bonded to a honey comb material in such a manner that the honeycomb material is sandwiched therebetween are each made of a material composed mainly of a rigid body such as a metal with a high degree of planar accuracy.

Meanwhile, since those hexagonal cell walls of the honeycomb material which are to be bonded perpendicularly to these face materials have small thicknesses, those edges of the cell walls which are involved in the bonding are linear and, what is more, are not flat but uneven with respect to the faces to which they are bonded.

This requires butt-joint bonding between planar members having great rigidity with a high degree of planar accuracy and hexagonal linear members that are not completely flat, thus making it impossible to secure a sufficient amount of space for the bonding and therefore making it impossible to obtain a great deal of bonding strength.

Further, since the foam material with which the spaces in the cells are filled is also irregular in thickness, and as such, is not of great use in reinforcement of bonding force.

Since the bonding force thus obtained is weak, there are some cases where a gap forms between the honeycomb material and either face material to reduce the sound insulating effect. Such a honeycomb panel laminate is inadequate as a constructional material for noise control, is insufficient in strength as a whole, and has a limited scope of application as a building material.

Solution to Problem

The present invention has been made in view of the foregoing problems, and provides a method for manufacturing a honeycomb panel laminate, the honeycomb panel laminate including a sound absorbing face, a sound absorbing layer, and a sound insulating face, the sound absorbing face being made of a sponge foam, the sound absorbing layer being composed of a honeycomb material and a layer obtained by filling spaces in cells of the honeycomb material with a hard foam material, the method including the steps of: bonding the honeycomb material to the sound absorbing face by applying an adhesive to hexagonal linear edges of cell walls of the honeycomb material constituting the sound absorbing layer, pushing the hexagonal linear edges of the cell walls against the sound absorbing face made of the sponge foam, and applying pressure to press the hexagonal linear edges, to which the adhesive has been applied, of the cell walls against the sponge foam so that the hexagonal linear edges of the cell walls bite into the sponge foam, the sound insulating face, which is parallel to the sound absorbing face and which faces the sound absorbing face across the honeycomb material, being made of a sponge foam; and bonding the honeycomb material to the sound insulating face by applying an adhesive all over a surface of the sound insulating face that is to be in contact with the honeycomb material, pushing opposite edges of the cell walls of the honeycomb material against the surface, to which the adhesive has been applied, of the sound insulating face made of the sponge foam, the opposite edges being opposite the hexagonal linear edges to which the adhesive was applied, and applying pressure to press the opposite edges against the surface, all over which the adhesive has been applied, of the sponge foam so that the opposite edges bite into the sponge foam.

As material for the sound absorbing face material and the sound insulating face material that is suitable for bonding to the honeycomb material, flexible sponge foam is selected. Taking advantage of the flexibility of the sponge foam allows bonding between the honeycomb material and foam material, which are irregular in thickness, and the sponge foam by allowing the honeycomb material to bite into the sponge foam. This causes the bonding site to change from being linear to being planar and therefore have a larger area. This makes the bonding strong, and also makes the structure of the honeycomb panel laminate stable.

Advantageous Effects of Invention

As face material for the sound absorbing face and the sound insulating face with the honeycomb material interposed therebetween, a flexible expanded polyethylene foam material, which is a type of sponge foam, is used, and as filling material for the spaces in the cells of the honeycomb material, an open-cell hard phenol material is used, whereby a lightweight and robust laminate was obtained which has a weight of 0.8 kg/m$^2$ in the case of a thickness of 15 mm and a weight of 2.0 kg/m$^2$ in the case of a thickness of 38 mm.

BRIEF DESCRIPTION OF DRAWINGS

FIG. 3-1 is a diagram showing the joining of a flat rigid-body material to an uneven surface formed by edges of cell walls of a honeycomb material and a filling foam material.

FIG. 4-1 is a diagram showing an adhesive applied to the outer side of a surface of the sound insulating face 6 of FIG. 4 opposite the honeycomb material and an adhesive-protecting sheet attached to the adhesive.

FIG. 4-2 is a diagram showing the bending of the honeycomb panel laminate of FIGS. 4 and 4-1.

FIG. 5-1 is a diagram showing the bonding of the honeycomb panel laminate of FIG. 4-1 to a curved rigid-body material.

FIG. 6-1 is a diagram showing the bonding of the honeycomb panel laminate of FIG. 4-1 to an existing in-situ framework (planar structure).

FIG. 6-2 is a diagram showing the bonding of the honeycomb panel laminate of FIG. 4-1 to an existing in-situ framework (curved structure).

DESCRIPTION OF EMBODIMENTS

A first feature of an embodiment of the present invention relates to a member serving as a sound absorbing face. In general, sponge cellular bodies come in two types of cellular structure: a sponge cellular material having an open-cell structure; and a sponge cellular material having a closed-cell structure. For sound absorption performance, the open-cell material, which has a structure in which cells are interconnected, is suited. For sound insulation performance, the closed-cell material, which has individually closed cells with blowing gas sealed therein, is suited.

Therefore, while the member serving as the sound absorbing face may be made of any material that is an open-cell sponge cellular body which offers great flexibility, the present invention has selected, from among polyethylene, urethane, rubber, and polypropylene open-cell bodies, an open-cell flexible polyethylene foam material, named SUPEROPCELL LC-3000#$^2$NN (manufactured by Sanwa Kako Co., Ltd.), which has a density of 35 kg/m$^3$.

A second feature of the embodiment of the present invention relates to a viscous adhesive that is used to bond the sound absorbing face material and a honeycomb material together. An emulsion adhesive (based on vinyl acetate resin; manufactured by Konishi Co., Ltd.) is used to bond together the honeycomb material and the open-cell polyethylene foam material serving as the sound absorbing face material. Alternatively, an epoxy, urethane, acrylic, or silicone adhesive may be used.

Examples of preferred conditions for selection of an adhesive are as follows: The adhesive is made of a material which has a viscosity desirably in the range of 15,000 to 70,000 mPas (30° C.) or more desirably in the range of 30,000 to 70,000 mPas, and which allows 20 minutes or longer for application.

A third feature of the embodiment of the present invention relates to the honeycomb material, which forms a sound absorbing layer. While the honeycomb material may take any cell shape, the honeycomb material is suitably made of a material based on paper impregnated with phenol, magnesium silicate, aluminum hydroxide, a waterproofing agent, etc.

A fourth feature of the embodiment of the present invention relates to a sound absorbing foam material with which the cells of the honeycomb material are filled. From among open-cell hard foam materials, a hard phenol foam material having a density of 20 kg/m$^3$ has been selected. This foam material has moisture absorption and moisture evaporation properties, and has such flame retardant properties as to exhibit resistance to ignition in testing with a lighter. It should also be noted that the primary purpose of employing the hard open-cell material is its sound absorbing function.

A fifth feature of the embodiment of the present invention relates to a sound insulating material (reflecting material). From among flexible closed-cell bodies, a polyethylene foam material, named SUNPELCA L-2501NN (manufactured by Sanwa Kako Co., Ltd.), which has a density of 35 kg/m$^3$, has been selected.

A sixth feature of the embodiment of the present invention relates to an adhesive applied to the closed-cell polyethylene foam material having a sound insulating function.

This adhesive (composed mainly of acrylic resin SK-DYNE 801B with a curing agent urethane resin L-45; manufactured by Soken Chemical Engineering Co., Ltd.) is a cold setting elastic adhesive applied in advance all over both surfaces or one surface of the closed-cell polyethylene foam material and, before use, has its adhesive surface covered with a protecting sheet.

Examples

Figure 1:
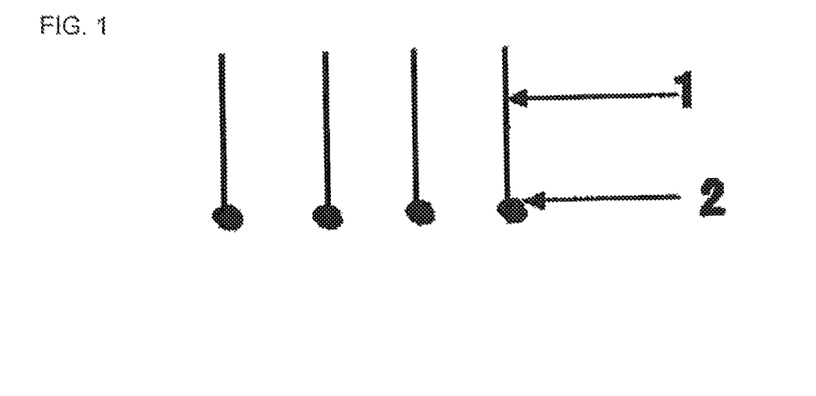
FIG. 1 is a diagram showing the application of an adhesive to edges of cell walls of a honeycomb material.

FIG. 1 is a diagram showing cell walls 1 of a honeycomb material made of paper impregnated with phenol resin and a vinyl acetate resin adhesive 2 applied to edges of the cell walls 1, the cell walls 1 each having a thickness of 7 mm or 30 mm with a cell size of 12 mm (regular hexagon) with an interval of 12 mm between cell walls facing each other). The adhesive is applied not only to the edges of the cell walls 1 of the honeycomb material but also to rising wall surfaces of the cell walls.

Figure 2:
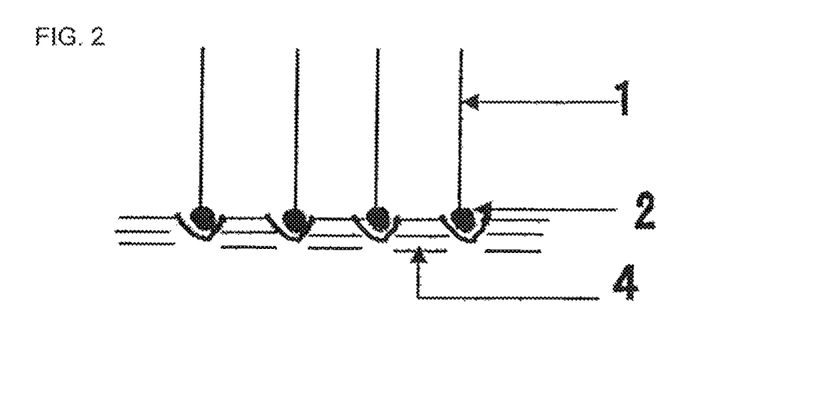
FIG. 2 is a diagram showing the bonding between a cellular polyethylene foam material of which a sound absorbing face is made and edges of cell walls of a honeycomb material via an adhesive applied to the edges, with the edges biting into the cellular polyethylene foam material.

FIG. 2 is a diagram showing the bonding between the edges of the cell walls 1 of the honeycomb material and an open-cell polyethylene foam material 4 serving as a sound absorbing face via the adhesive applied to the edges, the open-cell polyethylene foam material 4 having a thickness of 3 mm and a density of 35 kg/m$^3$, with the edges pushed against the open-cell polyethylene foam material 4 so that the cell walls of the honeycomb material bite into the sound absorbing face material under a pressure of about 100 kg/m$^2$.

The application of pressure causes those edges of the cell walls 1 of the honeycomb material to which the adhesive 2 has been applied to bite into the flexible foam material 4, and the adhesive causes the foam material to be bonded in such a state as to hold the edges of the cell walls 1 of the honeycomb material. This secures a sufficiently large amount of space for the bonding, including the surfaces of the cell walls of the honeycomb material, thus achieving improvement in bonding strength.

Figure 3:
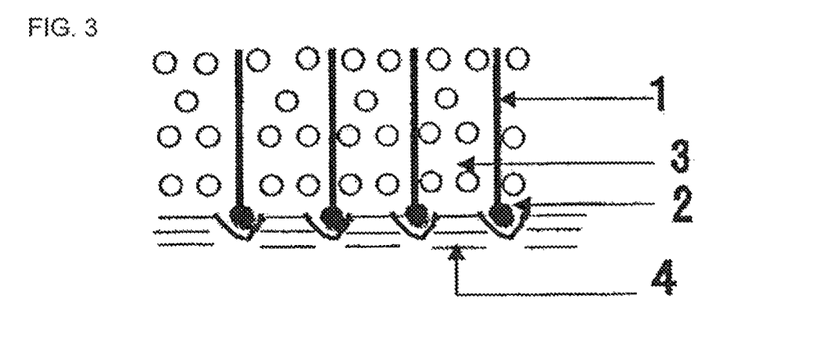
FIG. 3 is a diagram showing the filling of cell spaces of a honeycomb material with an open-cell hard phenol foam material.

FIG. 3 is a diagram showing the forced filling of cell spaces of the honeycomb material with an open-cell hard phenol foam material 3 having a thickness of 7 mm or 30 mm and a density of 20 kg/m$^3$. Since filling pressure causes the open-cell hard phenol foam material serving as a cell-filling material to be pressed against the open-cell polyethylene foam material serving as the sound absorbing face material, it is important to select density balance and filling pressure under such conditions that the filling pressure does not destroy the open cells of the hard phenol foam material.

Figure 31:
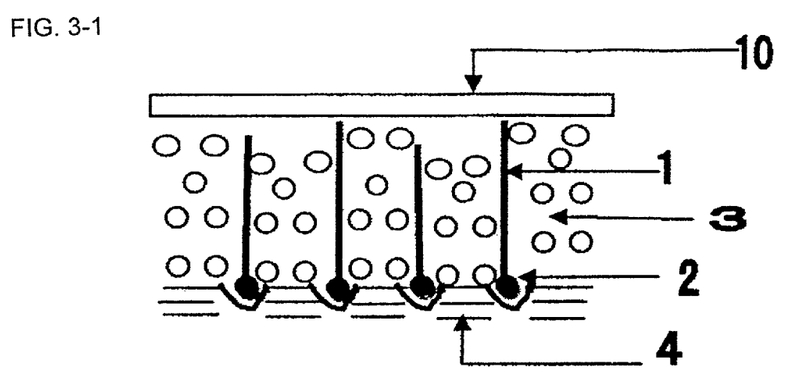

In FIG. 3, the cell walls 1 of the honeycomb material and the filling foam material 3 appear to in such a plane state as to have their surfaces at the same level as one another. In actuality, however, they are in such a state as that shown by an enlarged view in FIG. 3-1. An attempt to bond, to such an uneven surface, a rigid-body (such as metal-plate) sound insulating face 10 serving as a hard sound insulating material with a high degree of planar accuracy causes the rigid-body sound insulating face 10 to be unfitted with the uneven surface, so that a gap forms to generate a part where bonding does not take place.

As a measure against this, a closed-cell polyethylene foam material 6 was selected as a flexible sound insulating material to form the sound insulating face.

Figure 4:
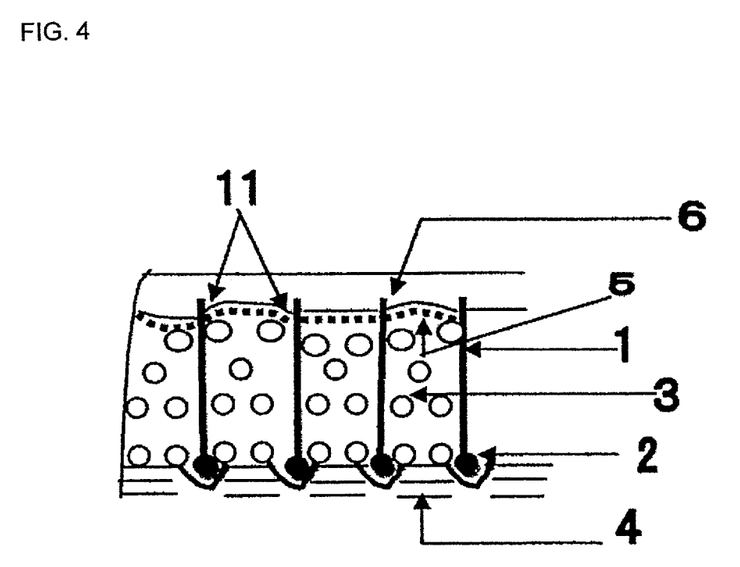
FIG. 4 is a diagram showing a state where the application of pressure has caused edges of cell walls of a honeycomb material to bite into a polyethylene foam material serving as a sound insulating material and the bonding of the polyethylene foam material in close contact with a filling foam material having an unequal thickness.

FIG. 4 shows a state where a flexible sound insulating face 6 made of a closed-cell polyethylene foam material having a thickness of 5 mm and a density of 35 kg/m$^3$ is used instead of the rigid sound insulating face 10. Further, the honeycomb material has its cell spaces filled with an open-cell hard foam material 3.

As shown in FIG. 3-1, in general, the cell walls 1 of the honeycomb material and the foam material 3 are irregular in height. In this state, pressing of the flexible sound insulating face 6 made of a closed-cell polyethylene foam material against the cell walls 1 of the honeycomb material by a pressure of 100 kg/m$^2$ causes the edges of the cell walls 1 of the honeycomb material to be in such a state 11, as shown in FIG. 4, as to bite into the closed-cell polyethylene foam material of which the sound insulating face 6 is made.

The in-advance application of an acrylic/urethane resin adhesive 5 to that surface of the sound insulating face 6 into which the edges of the cell walls 1 of the honeycomb material bite allows the sound insulating face 6, which is made of a flexible closed-cell polyethylene foam material, to be in such a state 11 as to be totally in close contact with the cell walls 1 of the honeycomb material and the filling material 3 even if there are irregularities in the cell walls 1 of the honeycomb material and the filling material 3, thus giving a great bonding force.

It is from the aspect of bonding strength that the acrylic/urethane resin adhesive 5 of FIG. 4 has been selected. Alternatively, it is possible to select any other adhesive that has a strength which fits the present purpose.

Further, the structure of FIG. 4 is not so great in strength as a honeycomb panel laminate in a case where the sound insulating face 6 has a small thickness, and as such, has its limitations in self-standing property and in sound insulating effect.

A possible way of enhancing the self-standing property and the sound insulating effect is to attach a rigid body (such as a metal plate) for further reinforcement onto the outer side of the sound insulating face.

Figure 5:
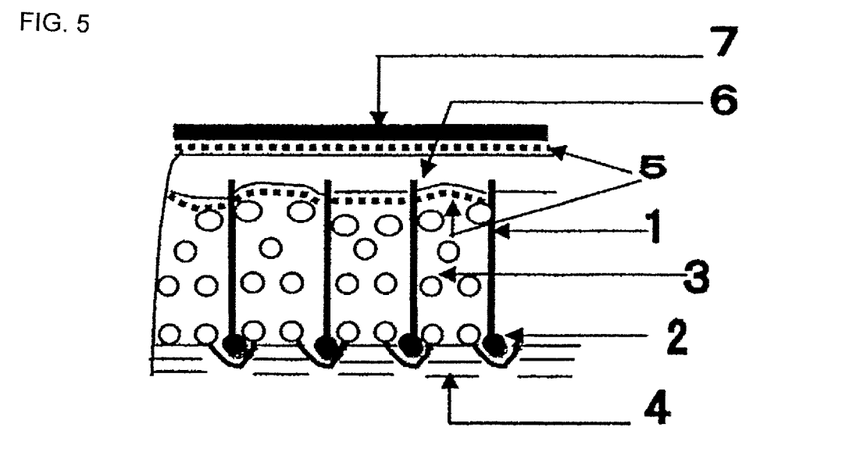
FIG. 5 is a diagram showing the bonding of a rigid-body material to a surface of a closed-cell polyethylene foam material.
Figure 41:
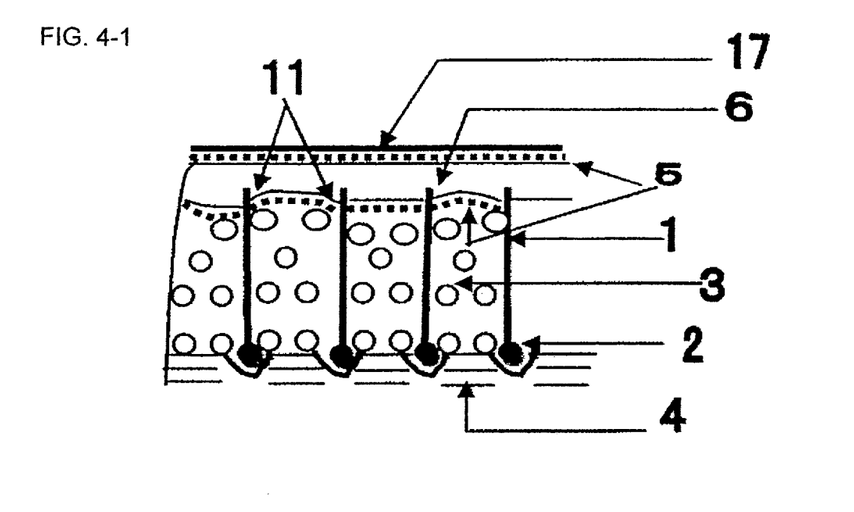

This is achieved by applying the adhesive 5 onto the closed-cell polyethylene foam material constituting the sound insulating face 6 as shown in FIG. 4-1 (as indicated by dotted lines on both surfaces of the sound insulating face 6 in FIG. 5) and further attaching an easily removable protecting sheet 17 to the outer side of an adhesive surface that is opposite the surface in contact with the cell walls 1 of the honeycomb material.

A protection plate 7 (FIG. 5) made of a non-breathable and high-mass rigid-body material is attached by first removing the protecting sheet 17 (FIG. 4-1) attached in advance onto the adhesive 5 applied to the sound insulating face 6 made of a closed-cell polyethylene foam material and then attaching the rigid-body protection plate 7 onto the adhesive 5. This gives a honeycomb panel laminate having an enhanced self-standing property and an enhanced sound insulating effect.

On the other hand, in the case of the honeycomb panel laminate shown in FIGS. 4 and 4-1, the rigid-body protection plate 7 for an increase in strength is not bonded, with a polyethylene foam material used as the sound absorbing face and the sound insulating face, with the honeycomb material based on paper impregnated with phenol, magnesium silicate, aluminum hydroxide, a waterproofing agent, etc., and with an open-cell hard phenol foam material used as a filling material for the cells of the honeycomb material. Since all these materials have such a degree of hardness as to be able to be easily cut with a cutter or scissors, the honeycomb panel laminate per se has a feature of being excellent in workability.

Further, since, in a conventional honeycomb panel laminate, the sound absorbing and sound insulating faces between which the honeycomb material is sandwiched have been composed mainly of rigid-body (metal) materials, it has been difficult to curve the conventional honeycomb panel laminate. This has made it impossible to achieve a honeycomb panel laminate compatible with a curved surface.

In actual use of a honeycomb panel laminate, it is very convenient if the laminate as a whole could be utilized in a curved shape. There have been expectations for the achievement of a honeycomb panel laminate compatible with a curved surface.

In this regard, the invention as set forth in claim 1 of the present application has its sound absorbing and sound insulating faces made of a flexible polyethylene foam material, and is therefore compatible with a curved surface. The problem lies in whether or not the honeycomb-structured sound absorbing layer is compatible with a curved surface.

Figure 7:
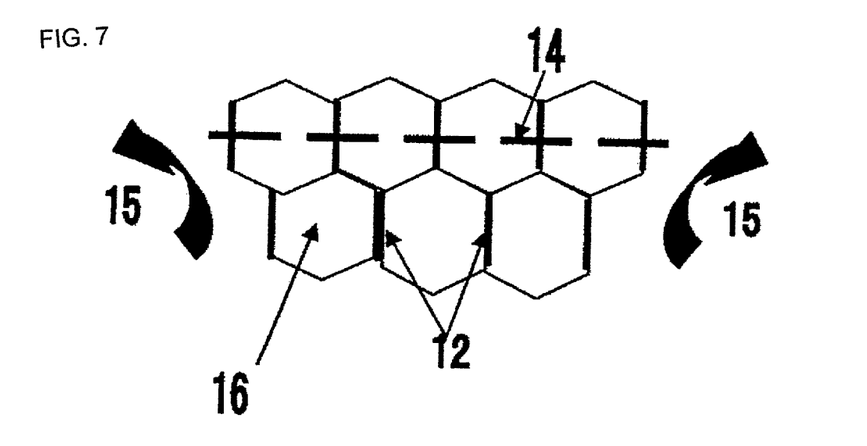
FIG. 7 is a diagram showing a cell structure of a honeycomb material and a direction in which the honeycomb material is easily bent.

FIG. 7 shows that a tight arrangement of regular hexagonal honeycomb unit cells 16 on a flat surface causes the resulting honeycomb material to be a structure which exhibits strength. A sound absorbing layer actually constituted by using a honeycomb material having such unit cells tightly arranged is resistant to bending, and appears to have the same strength in any direction.

However, an actual way of making a honeycomb layer is not by connecting unit cells tightly arranged, but the honeycomb layer is prepared by placing a large number of layered materials side by side so that their band faces are parallel to each other and bonding them at cell walls 12 of FIG. 7. Therefore, each of the cell walls 12 is constituted by two layered materials attached to each other using an adhesive. On the other hand, each of the other cell walls is constituted by a single layered material, with no adhesive applied thereto.

Therefore, it is assumed that in the resulting structure, the strength of the cell walls 12 is twice as great as that of the other cell walls. In the case of application of torsional stress to each cell wall under such conditions, the cell walls other than the cell walls 12 are torsionally deformed by relatively small torsional stress, but the cell walls 12 are not torsionally deformed unless relatively large torsional stress is applied to them.

The gradual application of stress in an attempt to curve the whole honeycomb panel laminate in a plane 14 perpendicular to the cell walls 12 in FIG. 7 (e.g. to bend the whole honeycomb panel laminate in the directions of arrows 15, i.e., in the directions vertical to the plane of paper) causes the cell walls other than the cell walls 12 to be torsionally deformed by torsional stress at a comparatively-early stage. At this stage, the cell walls 12 will not be torsionally deformed. However, the bending of the honeycomb panel laminate in this direction does not require torsional deformation of the cell walls 12. Therefore, the honeycomb panel laminate can be curved as a whole. On the other hand, an attempt to curve the whole honeycomb panel laminate in a plane different from the plane 14 inevitably requires torsional deformation of the cell walls 12 to a greater or lesser extent. However, since the cell walls 12 are each constituted by two layered materials fixed firmly to each other using an adhesive, the cell walls 12 are highly resistant to torsional stress and do not easily get torsionally deformed. Therefore, the honeycomb panel laminate cannot be easily curved as a whole.

It was found that since, in a general honeycomb material, each of the cell walls 12 is constituted by two layered materials bonded to each other using an adhesive having a sufficiently high bonding strength, the honeycomb panel laminate has such properties as to be able to be easily curved in a plane perpendicular to a plane constituted by two layered materials, but hardly able to be curved in another plane.

Therefore, the honeycomb panel laminate is easily bent in a direction with respect to the direction of arrangement of cells of the honeycomb material, so when bent for use, the honeycomb panel laminate needs to be bent in the direction in which it is easily bent. Further, when a rigid-body protection plate is used for the purpose of achieving a self-standing property, the purpose can be achieved by preparing a curved rigid-body protection plate, bending the honeycomb panel laminate into a curved shape in the direction in which it is easily bent, and pressing the surface of the adhesive, which has been applied to the curved closed-cell polyethylene foam material, against the rigid body so that the honeycomb panel laminate is bonded to the rigid body.

FIG. 4-2 shows a case where by applying this principle, for example, the structure of FIGS. 4 and 4-1 is bent in the directions 13 of an arc-shaped arrow (i.e. upward and downward in the plane of paper). Further, FIG. 5-1 shows the bonding of a honeycomb panel laminate having the structure of FIG. 4-1, with a total thickness of 15 mm (honeycomb material/filling foam material thickness 7 mm) to a 2-mm-thick aluminum plate 8 bent in advance with a bend radius of 50, by removing the protecting sheet 17 from the honeycomb panel laminate, fitting the honeycomb panel laminate with the curved surface of the aluminum plate 8, and pressing the honeycomb panel laminate against the curved surface of the aluminum plate 8.

Figure 61:
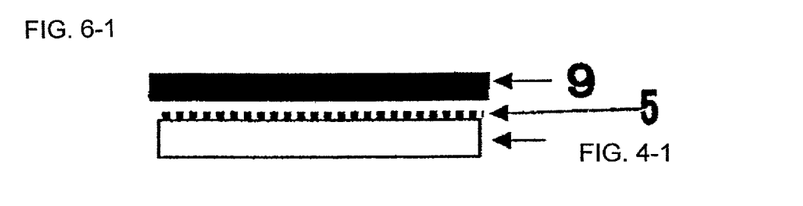
Figure 62:
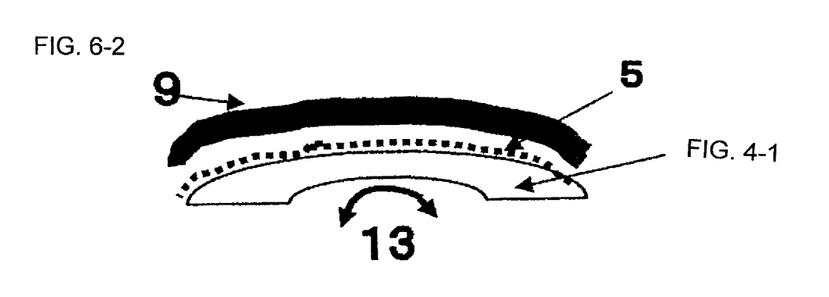

Each of FIGS. 6-1 and 6-2 is a diagram showing the attachment of a honeycomb panel laminate of FIG. 4-1 to the wall surface 9 of an existing plate made of iron (which may alternatively be made of a non-breathable material such as concrete or a woody material) surrounding an in-situ source of noise generation, using the adhesive 5 with the protecting sheet 17 removed. FIG. 6-1 shows a case where the plate to which the honeycomb panel laminate was attached is flat, and FIG. 6-2 shows a case where the plate to which the honeycomb panel laminate was attached is curved. The arrow 13 indicates upward and downward bending in the plane of paper.

Further, the sound attenuation performance of a honeycomb panel laminate of the present invention is described.

Table 1 shows results of measurement of the sound attenuation performance by a BOX of a sound absorbing and sound insulating structure with six sides each measuring 345×320× 300 H mm. The measurements were performed by using a Seiko alarm clock Super Raiden (with an immediate MAX value of 100 dBA) as a sound source reference of noise, placing the sound source in the center of the BOX, and placing the sound source and a measuring device (Rion NA-27) at a distance of 500 mm from each other as a measurement reference. It should be noted that in the case of a honeycomb panel laminate of a structure with an aluminum plate, the aluminum plate had a thickness of 1.2 mm according to the thickness of the aluminum plate of the comparison reference BOX.

TABLE 1

| Frequency Hz | 1250 | 2000 | 2500 | 3150 | 4000 | 5000 | 8000 | 10000 |
|---|---|---|---|---|---|---|---|---|
| Present invention (Case 1) | 40.6 | 41.8 | 49.1 | 41.5 | 49.7 | 45.9 | 47.2 | 49.8 |
| Present invention (Case 2) | 45.6 | 48.5 | 48.9 | 37.1 | 35.1 | 32.2 | 32.3 | 32.1 |
| Present invention (Case 3) | 39.0 | 38.0 | 42.8 | 27.9 | 33.8 | 29.5 | 29.8 | 29.8 |
| Conventional technology (Patent Literature 2) | 42.1 | 42.7 | 42.4 | 37.5 | 45.4 | 40.1 | 41.2 | 45.6 |
| Sound source reference | 55.8 | 59.2 | 59.8 | 64.9 | 66.9 | 63.7 | 66.7 | 68.2 |

Unit: dBA

In Table 1, the present invention (Case 1) is a honeycomb panel laminate having the structure of FIG. 4, and the laminate has a thickness of 38.0 mm, the breakdown of which is as follows: an open-cell polyethylene foam having a thickness of 3 mm; an adhesive; a honeycomb material and a filling phenol foam having a total thickness of 30 mm; an adhesive; and a closed-cell polyethylene foam having a thickness of 5 mm.

The present invention (Case 2) is a honeycomb panel laminate having the structure of FIG. 5, and the laminate has a thickness of 16.2 mm, the breakdown of which is as follows:

an open-cell polyethylene foam having a thickness of 3 mm; an adhesive; a honeycomb material and a filling phenol foam having a total thickness of 7 mm; an adhesive; a closed-cell polyethylene foam having a thickness of 5 mm; and an aluminum plate having a thickness of 1.2 mm.

The present invention (Case 3) is a honeycomb panel laminate having the structure of FIG. 5, and the laminate has a thickness of 39.2 mm, the breakdown of which is as follows: an open-cell polyethylene foam having a thickness of 3 mm; an adhesive; a honeycomb material and a filling phenol foam having a total thickness of 30 mm; an adhesive; a closed-cell polyethylene foam having a thickness of 5 mm; and an aluminum plate having a thickness of 1.2 mm.

The conventional technology is a honeycomb panel laminate having the configuration of Patent Literature 2, and the laminate has a thickness of 32.8 mm, the breakdown of which is as follows: an aluminum fiber material having a thickness of 1.6 mm; an adhesive; a honeycomb material and a filling phenol foam having a total thickness of 30 mm; an adhesive; and an aluminum plate having a thickness of 1.2 mm.

The reference sound source is a reflecting BOX surrounded by an aluminum plate having a thickness of 1.2 mm, instead of being surrounded by a honeycomb panel laminate.

A comparison between the present invention (Case 1) and the sound source reference confirmed that the present invention (Case 1) attenuated sound from the sound source reference by 11 to 23 dB over the entire band of frequencies, exhibited a sound-attenuating effect of 17 dB on average, and was thus practical.

Furthermore, it was confirmed that the present invention (Case 3), which was obtained by attaching an aluminum plate having a thickness of 1.2 mm to the outer side of the present invention (Case 1), had an additional effect by a sound attenuation value of 7 to 20 dB at 2500 Hz or higher and 15 dB on average with respect to the present invention (Case 1).

Further, a comparison between the present invention (Case 1) and the present invention (Case 2) confirmed that at 3150 Hz or higher, the present invention (Case 2) had a greater sound-attenuating effect than the present invention (Case 1) did, despite its small total thickness of 16.2 mm.

A comparison between the present invention (Case 2) and the sound source reference, which does not have a sound absorbing structure, showed that the sound was attenuated by 10 dB in the band of frequencies of 1250 to 2500 Hz and a sound attenuation value of 28 to 36 dB was obtained in the band of frequencies of 3150 to 10000 Hz. Further, in the present invention (Case 3), the honeycomb/foam thickness of 30 mm brought about such an effect that the sound was attenuated by 17 to 21 dB in the band of frequencies of 1250 to 2500 Hz, with an improvement of 7 to 11 dB over the present invention (Case 2) in this region. Further, a sound attenuation value of 33 to 38 dB was obtained in the band of frequencies of 3150 to 10000 Hz. This showed that in the region of 3150 Hz or higher, the total thickness of 16.2 mm of the present invention (Case 2) and the thickness of 39.2 mm of the present invention (Case 3) made no difference.

A comparison between the conventional technology (Patent Literature 2), in which the honeycomb material and the filling foam have the same thickness, and the present invention (Case 3) showed that the present invention (Case 3) was better in sound attenuation value by 3 to 5 dB at 2500 Hz or lower and 10 to 15 dB at 3150 Hz or higher. Further, a comparison between the conventional technology (Patent Literature 2) and the present invention (Case 2) showed that even though the former had a thickness of 32.8 mm, which is twice as great as the thickness of 16.2 mm of the latter, the latter was better in sound attenuation value by 8 to 13 dB at 4000 Hz or higher. This shows the high efficacy of the present invention.

Further, as to the evaluation of the heat insulation capacity of the present invention, measurement of the heat insulation capacity of the structure of the present invention in FIG. 5 with the honeycomb and phenol foam materials having a thickness of 30 mm yielded a value of resistance of heat transmission of 1.07 $m^2 \cdot k/W$ (as measured by Japan Testing Center for Construction Materials).

A comparison of this value with the standard value of 0.6 $m^2 \cdot k/W$ set for heat insulating materials in Notification No. 998 (Mar. 30, 1999) of the Ministry of Construction showed that the heat insulation capacity is beyond the standard value.

Further, as to the evaluation of the flame retardant properties of the present invention, the flame retardant properties were tested in the "Combustion Test for Materials for Use in Railway Rolling Stocks" conducted by Japan Railway Rolling Stock & Machinery Association.

The test was conducted on a structure of FIG. 5 as a test piece constituted under such conditions as to use an open-cell polyethylene foam material as the sound absorbing surface material, use, as the sound absorbing layer, a honeycomb material impregnated with phenol resin and filled with a phenol foam material, use a closed-cell polyethylene foam material as the sound insulating material, and use an emulsion adhesive and an acrylic urethane resin adhesive, with the origin of fire placed facing the sound insulating material 4 of FIG. 5. The test piece passed the test as reported in Combustion Test for Materials for Use in Railway Rolling Stocks No. 23-482K.

As to the compatibility with curved surfaces, as already mentioned, the key to bending of a structure of the present invention is the handling of hexagonal elements of the honeycomb material. The honeycomb material has honeycomb hexagons each formed by six sides two of which are cell walls 12 strengthened by a double adhesive layer as shown in FIG. 7. The honeycomb material is easily bent in the plane 14 perpendicular to the cell walls 12 serving as the adhesive layer, and is hardly bent in a plane parallel to the cell walls 12.

Figure 42:
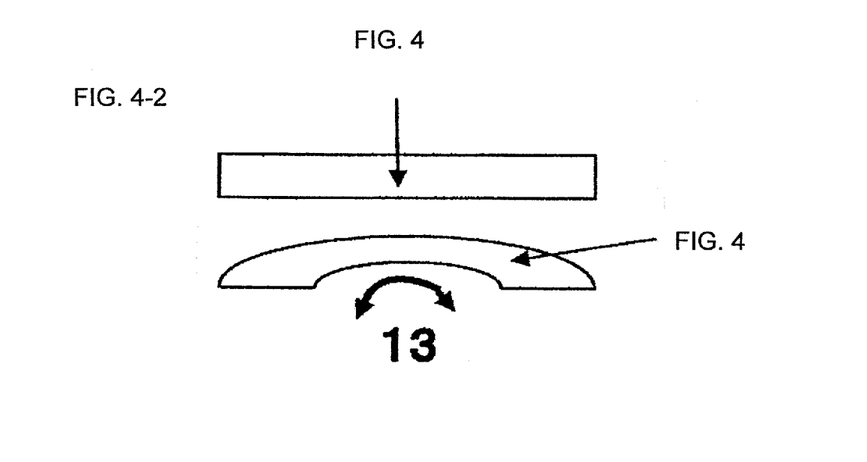
Figure 51:
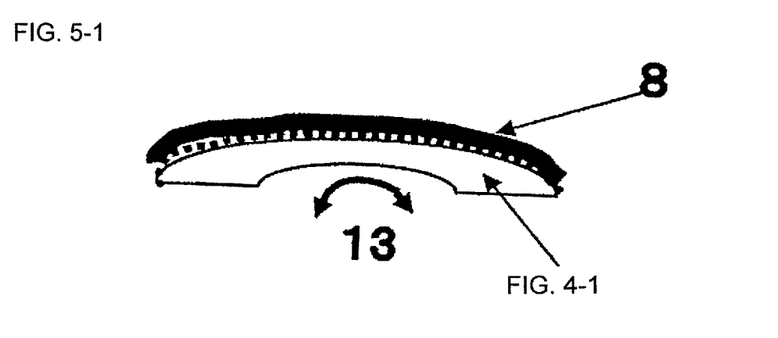

Taking advantage of this characteristic and the flexibility of the polyethylene foam materials adhering to both sides of the honeycomb material with a honeycomb core material therebetween makes it possible to follow bending. In FIG. 4-2, bending in the directions of the arc arrow 13 causes the inner side to contract and the outer side to expand. Further, the paper honeycomb material has unique elasticity and easily follows bending.

As to the stability of the adhesive part, too, it was confirmed that the method of the present invention, which produces a bonding state where the honeycomb material bites into the flexible foam and the honeycomb material is held, follows expansion and contraction, and serves as measures to prevent delamination of the bonding part.

In FIGS. 4-2 and 5-1, each of which shows a structure obtained by bending that shown in FIGS. 4 and 4-1, the honeycomb material and the foam material expand and contract, and the filling open-cell phenol foam material is not fixed in the honeycomb cell walls. As such, these materials freely move, thus making it possible to secure followability with respect to bending expansion and contraction.

Further, from the aspect of actual construction, too, it was easily possible to easily fit a FIG. 4-1 structure having a thickness of 15 mm with a curved structure having a bend radius of 50. As shown in FIGS. 5-1 and 6-2, a honeycomb panel laminate of FIG. 4 is bent in advance with the bent radius of an object so that a honeycomb panel laminate of FIG. 4 is easily mounted on a curve structure of 8 or 9. Expansion and contraction in the directions of the arc arrow 13 facilitates mounting onto a curved body.

Further, the cost of a honeycomb panel laminate according to the present invention is a fraction of the cost of a metal-structured honeycomb panel laminate having a surface made of a rigid body as seen in the conventional technology.

As to shortening of the length of a manufacturing process, too, since both the open-cell polyethylene foam material, which was in contact with the adhesive, and the open-cell hard phenol foam material, with which the honeycomb material had been filled, had a water-absorbing property, it was possible to instantly remove water from the vinyl acetate adhesive applied to the sound absorbing face. This led to shortening of the length of the process.

Further, as to the bonding of the sound insulating face, too, the acrylic/urethane resin adhesive applied in advance in another step gives a great bonding strength simply by being joined to the closed-cell polyethylene foam material, thus achieving shortening of setting time, hazardous materials safety, and measures against odors in comparison with a common epoxy adhesive (which cures in ten hours at room temperature).

INDUSTRIAL APPLICABILITY

A honeycomb panel laminate according to the present invention is useful in those fields where low-price, thin-profile, lightweight, and workable measures against high-frequency noise are required, and can also be utilized as a heat insulating material.

REFERENCE SIGNS LIST

1: Cell walls of a honeycomb material
2: Vinyl acetate resin adhesive applied to edges of cell walls of a honeycomb material
3: Open-cell hard phenol foam material serving as a cell-filling material
4: Flexible open-cell polyethylene foam material serving as a sound absorbing face
5: Adhesive that is used for the bonding of a closed-cell polyethylene foam material as a sound insulating material
6: Flexible closed-cell polyethylene foam material serving as a sound insulating material
7: Plate rigid-body material
8: Rigid-body material bent in advance
9: Flat plate and curved body serving as in-situ existing sound insulating structures (made of metal, concrete, etc.)
10: Flat rigid-body material serving as a sound insulating material
11: Part where a honeycomb material bites into a polyethylene foam material
12: Bonding part that maintains the shape of a honeycomb material
13: Arrow indicating a direction bending in an arc bending direction
14: Plane perpendicular to walls
15: Arrow indicating a bending direction
16: Diagram of a hexagonal element of a honeycomb material
17: Adhesive-protecting sheet

The invention claimed is:
1. A method for manufacturing a honeycomb panel laminate,
the honeycomb panel laminate including a sound absorbing face, a sound absorbing layer, and a sound insulating face,
the sound absorbing face being made of a sponge foam,
the sound absorbing layer being composed of a honeycomb material and a layer obtained by filling spaces in cells of the honeycomb material with a hard foam material,
the method comprising the steps of:
(a) before filling the cell spaces in the honeycomb material, which constitutes the sound absorbing layer, with the hard foam material, bonding the honeycomb material to the sound absorbing face by applying an adhesive to hexagonal linear edges of cell walls of the honeycomb material and to rising wall surfaces of the cell walls, pushing the hexagonal linear edges of the cell walls against the sound absorbing face made of the sponge foam, and applying further pressure to press the hexagonal linear edges, to which the adhesive has been applied, of the cell walls against the sponge foam so that the hexagonal linear edges of the cell walls bite into the sponge foam;
(b) after step (a), forming the sound absorbing layer by filling the cell spaces in the honeycomb material with the hard foam material by pressing the hard foam material into the cell spaces in the honeycomb material from a side of the honeycomb material opposite the sound absorbing face while applying pressure to such an extent that bubbles in the hard foam material do not get destructed, in order that the sound absorbing layer is in a plane state where the cell walls of the honeycomb material and the hard foam material are at substantially a same level, the hard foam material having substantially a same thickness as that of the honeycomb material,
the sound insulating face, which is parallel to the sound absorbing face and which faces the sound absorbing face across the honeycomb material, being made of a sponge foam; and
(c) bonding the honeycomb material to the sound insulating face by applying an adhesive all over a surface of the sound insulating face that is to be in contact with the honeycomb material, pushing opposite edges of the cell walls of the honeycomb material of the sound absorbing layer against the surface, to which the adhesive has been applied, of the sound insulating face made of the sponge foam, the opposite edges being opposite the hexagonal linear edges to which the adhesive was applied, the sound absorbing layer remaining in the plane state where the cell walls of the honeycomb material and the hard foam material are at substantially the same level, and applying further pressure to press the opposite edges against the surface, all over which the adhesive has been applied, of the sponge foam so that the opposite edges bite into the sponge foam.
2. A honeycomb panel laminate which is manufactured by the method as set forth in claim 1,
the sponge foam of which the sound absorbing face is made being an open-cell sponge foam,
the hard foam material constituting the sound absorbing layer being an open-cell hard foam material,
the sponge foam of which the sound insulating face is made being a closed-cell sponge foam.

3. The honeycomb panel laminate as set forth in claim 2, wherein the sponge foams of which the sound absorbing face and the sound insulating face are made, are polyethylene foam materials.

4. The honeycomb panel laminate as set forth in claim 2, wherein the foam material with which the cells spaces in the honeycomb material are filled is a hard phenol foam material.

\* \* \* \* \*